Aug. 25, 1959 C. A. HALL 2,901,280
WEEDING TOOL
Filed Oct. 24, 1957 2 Sheets-Sheet 1
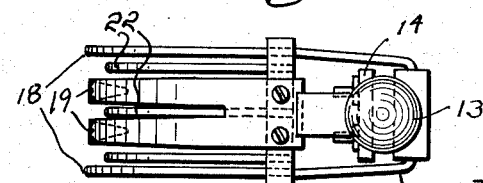
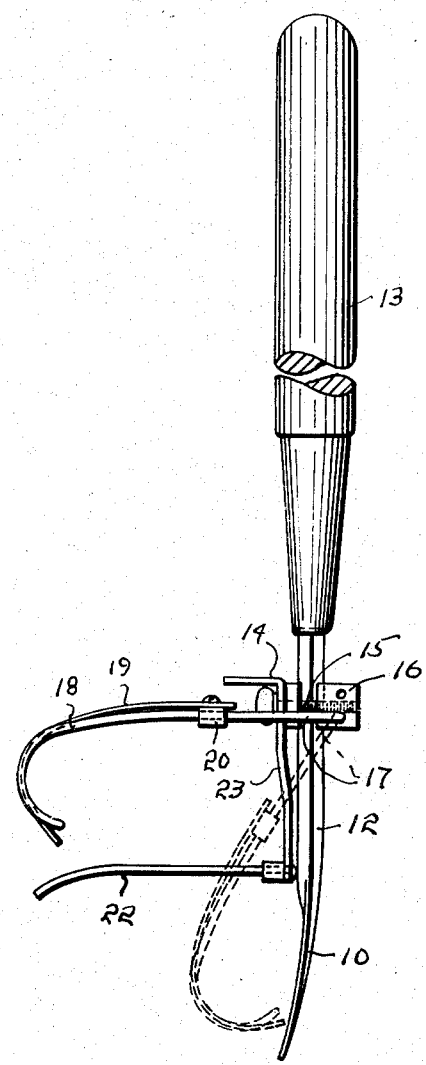
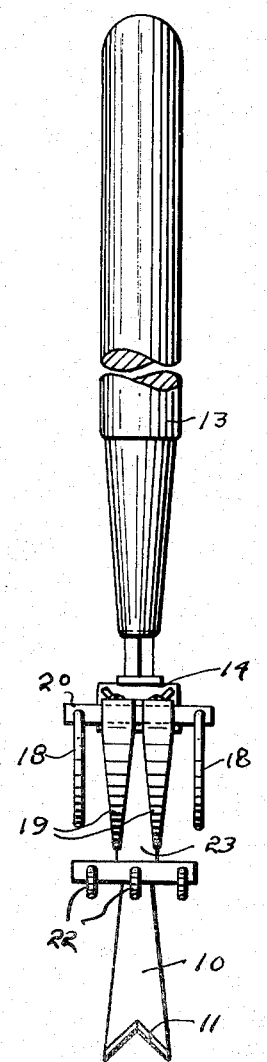
Inventor:
Chauncey A. Hall,
by Attorney Aug. 25, 1959 — C. A. HALL — 2,901,280
WEEDING TOOL
Filed Oct. 24, 1957 — 2 Sheets-Sheet 2
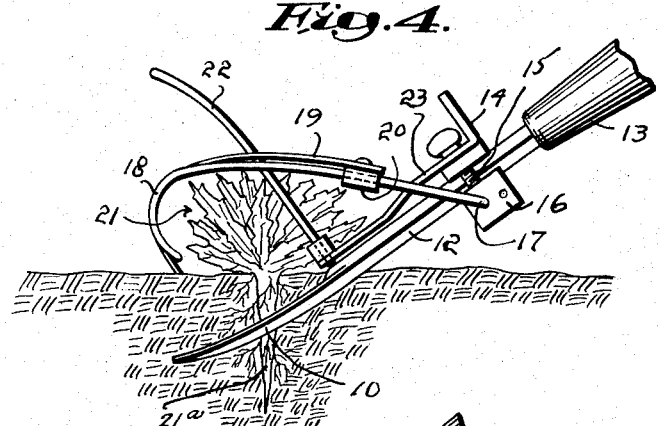
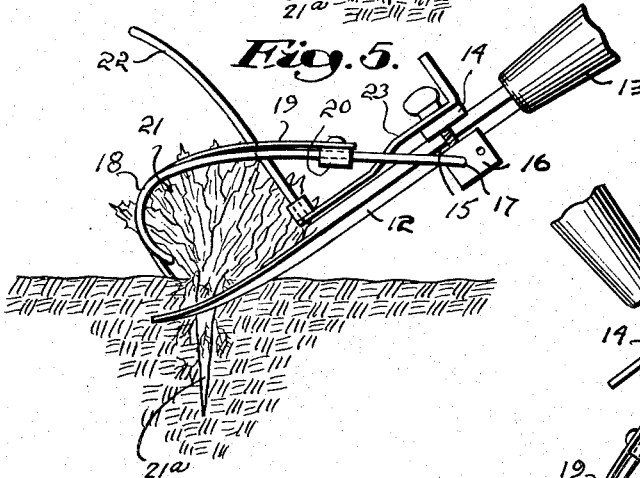
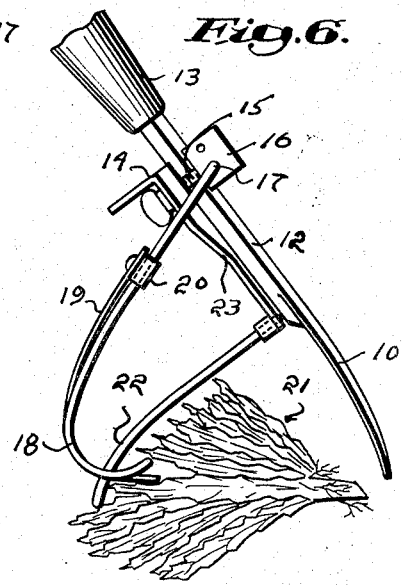
Inventor:
Chauncey A. Hall, United States Patent Office 2,901,280
Patented Aug. 25, 1959

2,901,280
WEEDING TOOL
Chauncey A. Hall, Melrose, Mass.
Application October 24, 1957, Serial No. 692,062
3 Claims. (Cl. 294—50.8)

The present invention relates to a weeding tool combining root cutting and weed extracting functions and to a weed extracting attachment for root cutting weeding tools.

In the care of lawns, weeding is a tedious but necessary chore that must be repeated several times each growing season. The most commonly used weeder has a handle and a relatively narrow, thin element connected thereto and having a cutting edge at its front end, usually V-shaped, adapted to be driven into the ground under a weed to sever its roots so that it can be pulled.

The principal objective of this invention is to combine, in a tool, root cutting functions, with a cutting element of the above described type, and weed extraction with means operable to engage the weed as the cutting element is withdrawn from the ground.

This objective may be attained, in accordance with the invention, by means of a tool combining both functions, or by an extractor attachment for the cutting element of existing weeders. In either case the invention provides that, in use, there is a unit transversely hinged to the cutting element rearwardly of its edge and including a plurality of transversely spaced claws. The claws are so disposed and arranged that they slide over the ground and swing upwardly relative to the cutting edge as the edge is driven into a root cutting position and to catch and extract the weed as the element is withdrawn. In practice, it is preferred that the tool have fixed fingers extending upwardly between the claws to enable extracted weeds to be forced therefrom when the tool is turned over, above a basket for example, to permit the claws to swing rearwardly and downwardly away from said element under the influence of gravity.

In the accompanying drawings, there is shown an illustrative embodiment of the invention from which this and other objectives, novel features, and advantages of the invention will be readily apparent.

In the drawings:

Fig. 1 is a view of the tool in accordance with the invention as viewed from the handle end thereof;

Figs. 2 and 3 are side and plan views thereof;

Fig. 4 is a side view of the tool illustrating root cutting;

Fig. 5 is a like view of the tool illustrating weed extraction; and

Fig. 6 is a side view of the tool turned over to illustrate weed ejection.

In the embodiment of the invention shown in the drawings, a relatively narrow and thin element 10 has a V-shaped cutting edge 11 and includes a shank 12, shown as of rectangular cross section, seated in a handle 13.

A mount 14 is detachably clamped to the shank 12 by means of screws 15 extending into its clamping bar 16 to which the ends 17 of claws 18 are pivotally connected. Claws 19 are attached to the cross member 20 carried by the claws 18.

It will be noted that the width of the mount, as defined by the several claws, is considerably greater than the maximum width of the element 10 and that the claws are disposed and arranged to swing upwardly and downwardly between a position in which their ends are close to but rearwardly of the cutting edge 11 and a position remote therefrom.

As will be apparent from Fig. 4, the use of the tool requires that it be so used as to drive the cutting edge into the ground and under a weed, such as the dandelion 21, to sever its roots 21ª. When this is done, the set of claws engage the ground and slide along the surface thereof until they have passed the body of the dandelion 21. When the tool is pulled to withdraw the cutting element, one or more of the claws catch the weed body and pull it from the ground as illustrated by Fig. 5. Sometimes, it may be found helpful to move the handle 13 to cause a slight up and down movement of the tool relative to the weed body.

The extracted weed 21 is held by the tool and, in use and as illustrated by Fig. 6, the retained weed body may be disposed of as by turning the tool upside down over a basket, for example, to fall therein as the claws swing away from the cutting element under the influence of gravity. As weed bodies sometimes get so caught that they will not fall from and cannot be shaken free from the claws, ejection means are provided. The ejection means is shown as comprising a plurality of fingers 22, each extending between two proximate claws, and carried by a support 23 with which the mount 14 is provided. The fingers 22, when the tool is inverted to eject the extracted weed, forcibly free the weed body as the claws swing downwardly.

From the foregoing, it will be apparent that the invention provides weeding tools that are well adapted to facilitate, to a maximum extent, the weeding of lawns and the like.

What I therefore claim and desire to secure by Letters Patent is:

1. In a weeding tool, an element having a cutting edge at its front end to be driven into the ground under a weed to sever its roots, a plurality of transversely spaced, parallel, forwardly extending, weed extracting claws transversely hinged to said tool rearwardly of said edge with their free, weed engaging ends curved towards said edge to slide over the ground and swing upwardly relative to said edge as said edge is driven into a root cutting position and to catch and extract the body of said weed as said cutting edge is withdrawn, and a plurality of fixed fingers mounted on said tool and extending upwardly between said claws to force said weed body therefrom when said tool is turned over and held to permit said claws to swing rearwardly and downwardly away from said element under the influence of gravity.

2. In a weeding tool, an element having a cutting edge at its front end to be driven into the ground under a weed to sever its roots, a mount including means engageable with said element to secure it thereto rearwardly of said edge, a plurality of transversely spaced, parallel, forwardly extending, weed extracting claws transversely hinged to said mount with their free weed engaging ends curved towards said edge to slide over the ground and swing upwardly relative to said edge as said edge is driven into a root cutting position and to catch and extract the body of said weed as said cutting edge is withdrawn, and a plurality of fixed fingers attached to said mount and extending upwardly between said claws to force said weed body therefrom when said tool is turned over and held to permit said claws to swing rearwardly and downwardly away from said element under the influence of gravity.

3. In a weeding tool, an element having a cutting edge at its front end to be driven into the ground under a weed to sever its roots, a mount including a pair of portions rearwardly of said edge clamped together with said element between them, a plurality of transversely spaced, parallel, forwardly extending, weed extracting claws transversely hinged to one of said mount portions with their free weed engaging ends curved towards said edge to slide over the ground and swing upwardly relative to said edge as said edge is driven into a root cutting position and to catch and extract the body of said weed as said cutting edge is withdrawn, and a plurality of fixed fingers attached to the other of said mount ports and extending upwardly between said claws to force said weed body therefrom when said tool is turned over and held to permit said claws to swing rearwardly and downwardly away from said element under influence of gravity.

References Cited in the file of this patent

UNITED STATES PATENTS

| | | |
|---|---|---|
| 1,751,481 | La Tourrette | Mar. 25, 1930 |
| 1,958,757 | Klingler | May 15, 1934 |
| 2,304,677 | Burnett | Dec. 8, 1942 |